United States Patent [19]

Murphy

[11] Patent Number: 5,696,536
[45] Date of Patent: Dec. 9, 1997

[54] PHOTO MOUSE PAD AND METHOD OF MAKING

[76] Inventor: Kevin M. Murphy, 1990 Del Amo Blvd., Suite A, Torrance, Calif. 90501

[21] Appl. No.: 577,775

[22] Filed: Dec. 22, 1995

[51] Int. Cl.$^6$ ............................................. G09G 5/08
[52] U.S. Cl. ............................ 345/163; 248/346.01
[58] Field of Search ............................. 345/163, 164; 40/358; D1/114; 248/346, 346.01; 281/2

[56] References Cited

U.S. PATENT DOCUMENTS

| | | | |
|---|---|---|---|
| D. 309,450 | 7/1990 | Hassel et al. | D14/114 |
| 4,799,054 | 1/1989 | House | 360/710 |
| 5,022,170 | 6/1991 | House | 40/358 |
| 5,123,191 | 6/1992 | Kim | 40/358 |
| 5,197,699 | 3/1993 | Smith et al. | 248/118 |
| 5,217,781 | 6/1993 | Kuipers | 428/85 |
| 5,232,247 | 8/1993 | Shields | 281/44 |
| 5,340,075 | 8/1994 | Schriner | 248/346 |
| 5,379,979 | 1/1995 | Due | 248/441.1 |
| 5,386,964 | 2/1995 | Mayo | 248/346 |
| 5,405,168 | 4/1995 | Holt | 281/2 |

*Primary Examiner*—Regina D. Liang
*Assistant Examiner*—Vui T. Tran
*Attorney, Agent, or Firm*—James G. O'Neill

[57] ABSTRACT

A mouse pad having a transparent top layer with a scratch resistent upper surface thereon, is secured to a resilient backing in such a manner that a pocket is formed between the resilient backing and the top layer to allow material having visual information thereon to be inserted and removed from the pocket via an opening formed through the resilient backing. The present invention also provides a method for forming mouse pads having pockets therein, by first printing on at least one side of a top surface layer, laminating a series of layers of different material together and die cutting the mouse pad and an opening through all the layers except the upper surface layer to allow access to the pocket.

20 Claims, 3 Drawing Sheets

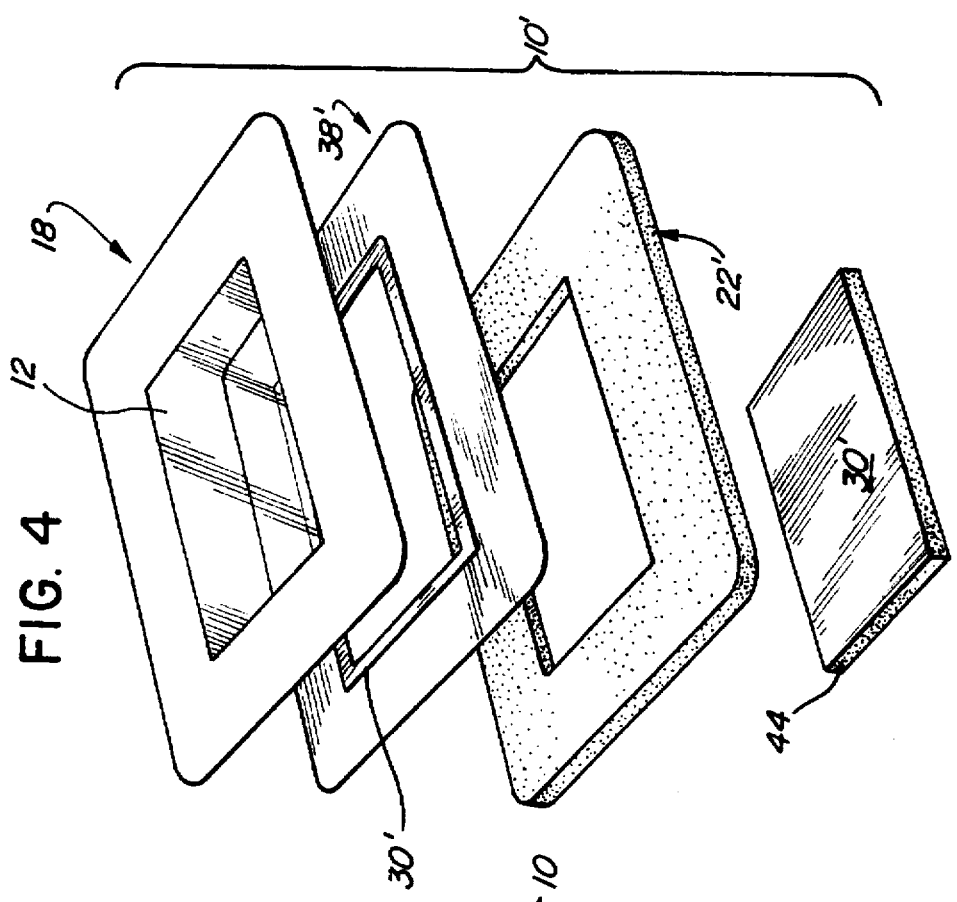
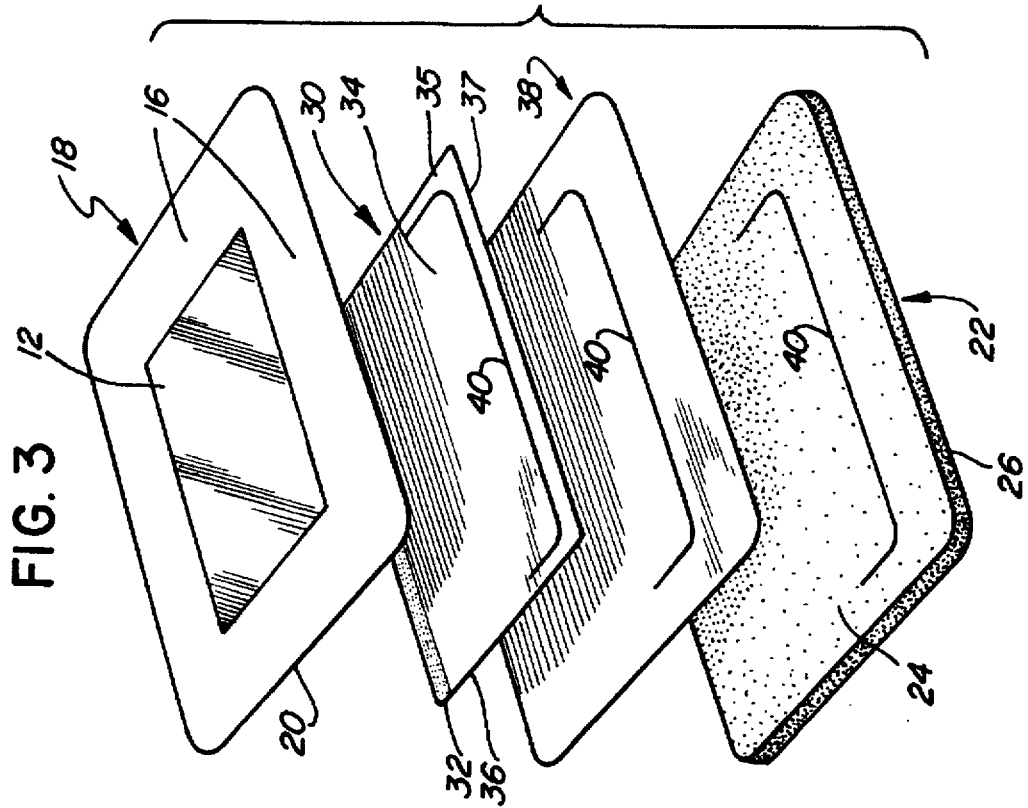

PHOTO MOUSE PAD AND METHOD OF MAKING

BACKGROUND OF THE INVENTION

1. Field of the Invention

This invention relates generally to computer mouse pads, and more particularly, to a computer mouse pad into which a photograph or the like may be inserted and/or removed.

2. Description of Related Art

Numerous types of computer mouse pads are known to allow a computer user to properly operate a mouse connected to a computer, such as a personal computer ("PC"). Such mouse pads come in many different sizes and shapes, and are a necessity when using today's software with the available computers.

However, such mouse pads take up precious space on already crowded desks or work spaces containing the computer and accessories being used. Therefore, some mouse pads have been designed for more than one purpose in mind.

One such prior art mouse pad having a dual purpose is shown in U.S. Pat. No. 5,405,168, which discloses a combination mouse pad and note pad. The mouse pad includes a working surface on which notes can be written and a computer mouse operated. The combination pad includes a plurality of secured together sheets of paper. However, this combination pad is limited to the writing on and tearing off of sheets of paper from it top surface.

In U.S. Pat. No. 5,340,075 there is disclosed an ergonomic mouse pad which includes a curved region for facilitating the comfort and ease of use of the hand and wrist of a mouse user. This mouse pad, however, does not provide a dual use function.

U.S. Pat. No. 5,217,781 discloses a mouse pad composed of number of layers of specific plastics with a bottom non-skid layer. This mouse pad, also does not provide a dual use function.

U.S. Pat. No. 4,799,054 discloses a mouse pad having a specific control surface having a random uniform texture formed on a control layer supported on a resilient intermediate layer. Optionally, the control layer is formed from a transparent material and an information display can be provided on the side of the control layer opposite from the control surface that allows visual information to be permanently displayed. However, this mouse pad does not contain means, or have the ability of changing the information being permanently displayed.

U.S. Design Pat. No. 309,450 discloses an ornamental design of computer mouse pad having what appears to be a raised surface for a computer mouse and holding recesses or areas.

U.S. Pat. Nos. 5,022,170 ("'170"), 5,232,247 ("'247"), 5,123,191 ("'191") and 5,386,964, show various multi-layer desk pads or work surfaces. In particular, the '170, '247 and '191 patents show pads having working surface covered by a top transparent layer of vinyl or some other type plastic which can be lifted to insert and remove material containing visual information that may be viewed through the transparent layer when closed.

U.S. Pat. Nos. 5,379,979 and 5,197,699 disclose, respectively, a device for supporting ring binders on a desk and a combination wrist rest and mouse pad for use with a computer.

While the foregoing described prior art devices provide some limited improvements in the mouse pad and desk pad art, there remains the need in the art for a mouse pad that may also be used to easily and conveniently hold a photograph or other material containing visual information in an attractive setting. And which material may be easily changed and viewed when using the mouse pad. Furthermore, there exists the need for a method of manufacturing mouse pads which contain an interior pocket which may easily have a photograph or the like inserted and removed therefrom.

SUMMARY OF THE INVENTION

Accordingly, it is a general object of the present invention to provide an improved mouse pad. It is a particular object of the present invention to provide a mouse pad providing multiple features. It is a still more particular object of the present invention to provide an improved mouse pad having a transparent upper surface for showing visual information therethrough. It is yet a more particular object of the present invention to provide an improved mouse pad having a pocket with a rear opening, for holding material containing visual information therein that may be viewed through a transparent window surrounded by a frame. It is a further particular object of the present invention to provide an improved method for making a mouse pad. And, it is still a further particular object of the present invention to provide an improved method to make one or more mouse pads having a pocket formed interiorly thereof behind a transparent window for holding material having visual information thereon.

In accordance with one aspect of the present invention, there is provided a mouse pad having a transparent top layer with a scratch resistent upper surface, secured to a resilient backing in such a manner that a pocket is formed between the resilient backing and the top layer so that material having visual information thereon may be inserted and removed from the pocket via an opening formed through the resilient backing. Additionally, the present invention provides a method to form the improved mouse pad and pocket by printing on at least one side of a top surface layer, laminating a series of layers of different material together and die cutting mouse pad and an opening through all the layers except the upper surface layer to allow access to the pocket.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein like reference numerals are used throughout the several views, and, in which:

FIG. 3 is an exploded isometric view of the mouse pad of the present invention, looking toward the top surface, showing the various layers thereof before they are secured together by the novel method of the present invention; and FIG. 4 is an exploded isometric view of a further embodiment of the mouse pad of the present invention.

DESCRIPTION OF THE PREFERRED EMBODIMENTS

Figure 1:
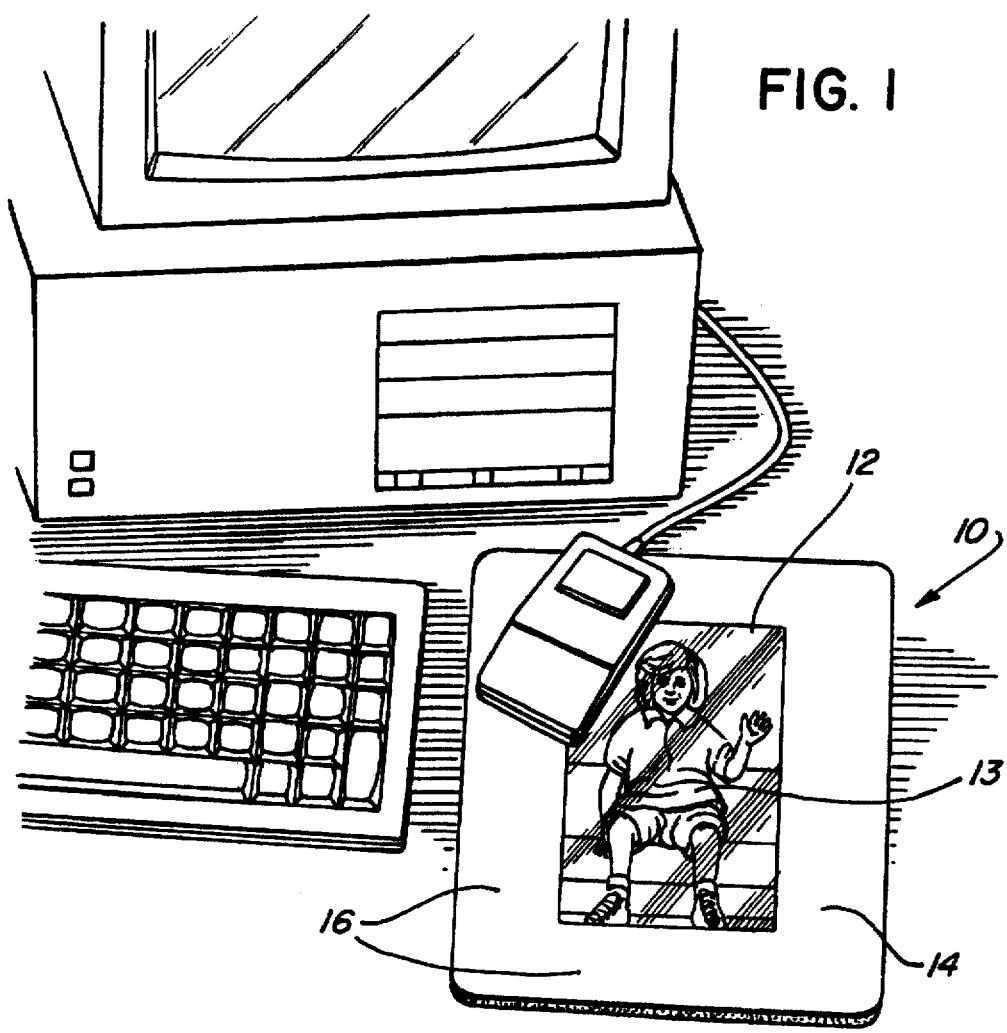
FIG. 1 is a partial isometric view of a preferred embodiment of a mouse pad of the present invention, having a photograph therein, looking toward the top surface of the mouse pad, with its bottom surface resting on a working surface, adjacent a computer keyboard and a computer, with a mouse on the top surface of the pad.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a description of an improved mouse pad 10, and various methods of making the same.

The mouse pad 10 can be of any desired size, and made from a laminated sandwich of any readily available materials, such as plastics and rubber, and is assembled or manufactured, as described below. The pad 10 has a clear or transparent central portion or window 12 for showing or viewing a photograph or other visual material 13 through a top surface 14. The central window portion is surrounded by a frame 16. As best shown in FIG. 3, the top surface 14 is the top surface of a top layer of material 18, such as a transparent vinyl or Lexan. The top surface 14 of the top layer 18 is preferably made scratch resistent, and has the frame 16 formed on the lower surface 20 thereof, by any available means, such as by printing.

The mouse pad 10 also includes a bottom layer 22 having an upper surface 24 and a bottom surface 26. In the preferred embodiments of the laminated sandwich of materials forming the pad 10 shown in FIG. 3, and the pad 10' shown in FIG. 4, the bottom layer 22 and 22' respectively, are resilient and formed from a material such as an open cell rubber which provides a cushioning means, prevents the pad from moving, and allows the bottom surface to readily conform to uneven surfaces.

Figure 2:
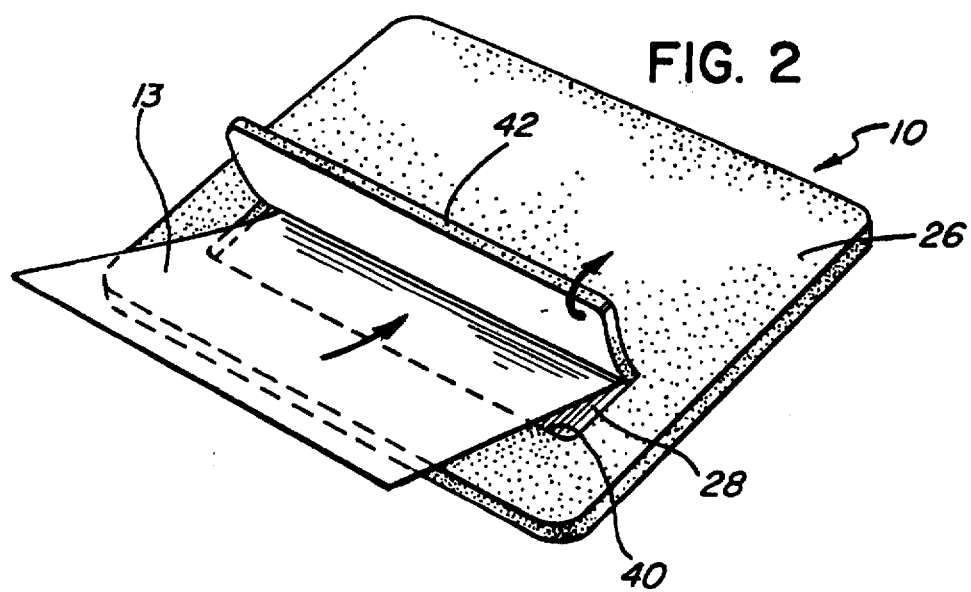
FIG. 2 is a further isometric view looking toward the bottom surface of the mouse pad of FIG. 1, showing a partial slit opening formed in the bottom surface in the open position to allow access to an internal pocket and a photograph or other material having visual information thereon being inserted into the pocket.

To enable an interior pocket 28 to be formed in the assembled mouse pad 10 (see FIG. 2), a further or central layer 30 (FIG. 3) or 30' (FIG. 4) is provided below the top layer 18. This further layer 30, 30' is preferably made from paper or the like, and is sized and dimensioned so as to be slightly larger than the clear central window 12. That is, when in position, the paper layer 30, 30' entirely covers the lower surface of the clear window area 12, and also extends only partly into the surrounding frame area 16. It can, therefore, be appreciated that the paper layer 30, 30' is smaller than both the top layer 18 and bottom layer.

For purposes of description only, referring now to FIG. 3, the further paper layer 30 is shown as including a strip of adhesive 32, such as a releasable adhesive of the type used in Post-It type notes, along one side edge 33 of the top surface 34 thereof. This strip of adhesive allows the layer 30 to be secured to the lower surface 20 of top layer 18 in a position to cover the entire lower surface 20 in the area of the central window 12, and to slightly overlap this window area 12 into the surrounding frame 16. The other three side edges 35, 36 and 37 of the top surface 34 do not require any adhesive thereon, since it is not needed to allow the paper paper layer 30 to be secured to the lower surface 20 in the correct position.

With the paper layer 30 secured in position over and covering the lower surface 20 of the central window portion 12, the top and bottom layers 18 and 22 are then laminated together, as by placing a pressure sensitive adhesive film 38 between the top layer 18 and bottom layer 22 and sealing the layers 18 and 22 together. With the layers 18 and 22 laminated or sealed together, the lower surface 37 of paper layer 30 contacting the pressure sensitive adhesive film 38 will be sealed to the upper surface 24 of the bottom layer 22 by the adhesive film. However, since no adhesive contacts the top surface 34 of paper layer 30, the top surface will prevent the layers 18 and 22 from being sealed together in the lower surface area 20 covered by the paper layer 30, behind or below the window portion 12. This unsealed area forms the interior pocket 28 directly behind or below the clear window 12.

To further understand the method of the present invention, it should be pointed out that the top layer 18 initially has the frame 16 applied thereto, as by being printed on the lower surface 20 thereof. This frame 16 may be in any desired color, such as black, to more readily bring out or contrast with the clear central window portion 12. A second color is then used to print register or registration marks (not shown) on the lower surface 20. These registration marks are used as a guide to allow the further paper layer 30 to be secured to the lower surface 20 by adhesive strip 32, in the proper position, entirely covering the bottom surface area 20 of the clear window 12, and overlapping into the frame 16. The size of the paper layer 30 used determines the size of the interior pocket 28 formed in the mouse pad 10. The top layer 18 and bottom layer 22 are then laminated together, with the paper layer therebetween, using the pressure sensitive adhesive film 38, or flood coating the materials with liquid adhesive. After the materials have been laminated together, the mouse pad 10 is die cut to the desired shape, while simultaneously forming a slit opening 40 by "kiss-cutting" through the bottom layer 22, adhesive film 38 and paper layer 30 into the interior pocket 28. The slit opening 40 allows access to pocket 28, as by lifting a lip portion 42 (see FIG. 2), so as to allow a photograph 13, or other material having visual information thereon, to be inserted into and out of the interior pocket 28. After the material or photograph 13 is inserted into the interior pocket 28 through slit 40 from the rear or bottom surface 26 thereof, the mouse pad is turned over and ready for use, with the material or photograph 13 in position to be viewed through the top surface 14 via the clear window portion 12 (see FIG. 1). Another process of production, although less desirable, would eliminate the use of a paper liner in the pocket. By printing a liquid adhesive in the same pattern as the frame 16, but with a slightly enlarged window openings, the rubber sheet can be adhered directly to the vinyl. While this would reduce production costs, the exposed rubber would cause friction-making insertion of the photographs difficult.

In another embodiment of the invention shown in FIG. 4, substantially all of the interior pocket 28 below clear window 12 of top layer is opened by die cutting out a complete section 44, preferably rectangular, through bottom layer 22', adhesive film 38' and paper layer 30'. This die cut section 44 may then be entirely removed to allow access to pocket 28, and allow visual material to be inserted onto upper surface of the paper layer 30' on cut out portion 44, or inserted directly into, or removed out of the pocket 28.

Figure 5:
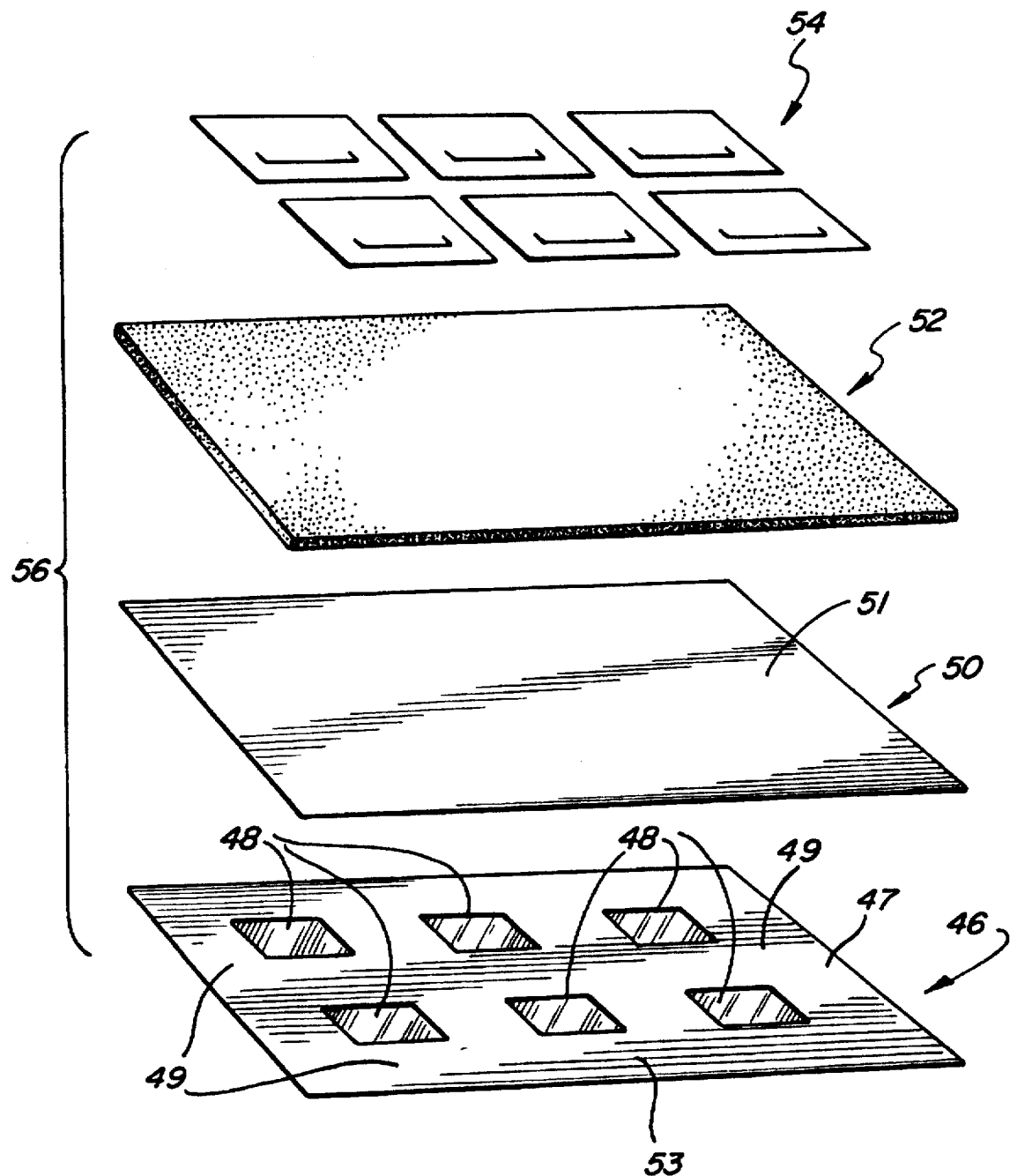
FIG. 5 is an exploded isometric view of a plurality of layers of material which are laminated together in a matrix to form a plurality of mouse pads using the novel method of the present invention.

Referring now to FIG. 5, there shown is an exploded view of a number of layers of material which are laminated together in a further embodiment of the method of the present invention to assemble or manufacture a plurality of mouse pads having pockets therein, in a matrix, for example six (6), in the example shown. This matrix or plurality of mouse pads are formed as follows: a clear, rigid, rectangular sheet of material 46, made from PVC, Lexan, or the like, is provided with a scratch resistant coating on one surface (the top surface). The other or bottom surface 47 (shown up in FIG. 5) of the sheet of material 46 is then printed or somehow provided with a dark pattern of frame areas 49, leaving a plurality of clear window areas 48, such as the 3×2 matrix shown. That is, the window areas 48 are surrounded or bounded by the frame areas 49. A liquid or similar adhesive 53 is then applied or printed only on the dark frame areas 49 of bottom surface 47, leaving the window areas free of adhesive. One side of a paper sheet or layer 50, having substantially the same rectangular size as the sheet of material 46, is then bonded to the liquid adhesive 53 in the dark frame areas 49, leaving the window areas 48 covered by the paper, but not having the paper sheet adhered thereto, thus forming a pocket similar to 28, below each window area 48 on surface 47. The other or upper side 51 of the paper sheet 50 shown in FIG. 5 is flood coated with adhesive, or a separate pressure sensitive adhesive film is applied thereto, and a further layer of material 52, such as a rubber sheet, of substantially the same rectangular size as the layers 46 and 50, is bonded to side 51 of the paper layer 50 so as to form a laminate or matrix 56 of the three layers 46, 50 and 52. This laminate or matrix 56 is then die cut, by a die means 54, into 6 separate mouse pads (or any desired number, depending on the size of the matrix 56 thus formed), while also simultaneously "kiss-cutting" slit openings, similar to 40, through the back of each mouse pad to provide a slit opening into a pocket, such as 28, formed in each mouse pad.

It, therefore, can be seen that the present invention provides a novel mouse pad which allows material to be easily inserted and removed into a pocket behind a clear window portion surrounded by a frame. The mouse pads of the present invention may be quickly and easily assembled by using the novel methods disclosed and claimed herein.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A laminated mouse pad comprising, in combination:
   a transparent top layer having a scratch resistent top surface and a lower surface formed from a material selected from the group of PVC or Lexan;
   a resilient backing layer made from rubber and having an upper surface and a bottom surface;
   an intermediate paper layer having a top side and a bottom side secured between said upper surface of the resilient rubber backing layer and said lower surface of said transparent upper layer;
   an interior pocket formed between said lower surface of said transparent top layer and said top side of said intermediate paper layer;
   said interior pocket connected to an opening formed extending through said resilient rubber backing layer and said intermediate paper layer to enable material containing visual information to be inserted into or removed from said interior pocket, whereby said material containing visual information may be viewed through said transparent upper layer.

2. The mouse pad of claim 1, further including a frame printed on said lower surface of said transparent top layer to provide a clear window area surrounded by said frame and said intermediate paper layer is sized and dimensioned to cover said clear window area on said lower surface and to extend partially into said frame.

3. A method of forming at least one mouse pad comprising the steps of:
   selecting a top layer of transparent material having a top surface and a lower surface;
   forming a frame on said lower surface of said top layer of transparent material surrounding at least one clear central window area;
   selecting an intermediate layer of material with a top side and a bottom side;
   securing said intermediate layer of material to said lower surface of said top transparent layer, by an adhesive;
   selecting a bottom layer of material having a bottom surface and an upper surface;
   laminating said lower surface of said top layer of transparent material to said upper surface of said bottom layer of material with said intermediate layer therebetween to form an interior pocket in said mouse pad between said lower surface of said top layer and said top side of said intermediate layer, and
   forming said interior pocket connected to an opening extending through said bottom layer of material and said intermediate layer to enable material containing visual information to be inserted into or removed from said interior pocket, whereby said material containing visual information may be viewed through said top layer of transparent material.

4. The method of claim 3 wherein said top layer of transparent material is selected from the group of PVC or Lexan, and said bottom layer of material is rubber, and said top layer and said bottom layer are laminated together with said intermediate layer therebetween by a pressure sensitive adhesive film.

5. The method of claim 3 wherein said top layer of transparent material is selected from the group of PVC or Lexan, and said bottom layer of material is rubber, and said top layer and said bottom layer are laminated together with said intermediate layer therebetween by flood coating the materials with liquid adhesive.

6. The method of claim 3 including the further step of die cutting the mouse pad to the desired shape from the laminated materials, said die cutting step simultaneously forming said opening through said bottom layer and said intermediate layer into said interior pocket.

7. The method of claim 3 including the further step of forming a number of registration marks on said frame and using said registration marks as a guide to secure said intermediate layer of material to said lower surface of said top transparent layer, by an adhesive strip so as to cover said at least one clear central window area and overlapping into said frame.

8. The method of claim 3 wherein a plurality of mouse pads having pockets therein are formed from a laminated matrix having a plurality of clear window areas surrounded by said frame; and said adhesive is only applied on said frame, leaving said plurality of clear window areas free of adhesive; and said laminated matrix when formed is die cut to form said plurality of mouse pads having pockets, and simultaneously kiss-cutting slit openings through said bottom layer to provide openings into a pocket formed in each of said mouse pads.

9. A laminated mouse pad comprising, in combination:
   a transparent upper layer having a scratch resistent top surface, a peripheral edge and a lower surface;

a resilient backing layer having an upper surface and a bottom surface; said upper surface being secured to and around at least said peripheral edge of said lower surface;

an interior pocket formed in said laminated mouse pad between the secured peripheral edge of said lower surface and said upper surface; and said interior pocket including a single opening formed extending entirely through said resilient backing layer into said interior pocket to allow the insertion and removal of material containing visual information into said interior pocket, whereby said material containing visual information will be firmly held between said bottom surface and said upper surface so as to be clearly viewed through said transparent upper layer.

10. The mouse pad of claim 9, further including an intermediate layer between said lower surface and said upper surface; said intermediate layer forming a bottom portion of said interior pocket.

11. The mouse pad of claim 10, further including a frame formed on said lower surface of said transparent top layer to provide a clear window area surrounded by said frame, and said intermediate layer is sized and dimensioned to only cover said clear window area and a small area of said frame around said clear window area, on said lower surface.

12. The mouse pad of claim 11 wherein said intermediate layer is a piece of paper having an upper side and a lower side; with only the lower side of said piece of paper being secured to said upper surface of said resilient backing layer so that said interior pocket is formed between said upper side of said piece of paper and said lower surface of said clear window area.

13. The mouse pad of claim 12 wherein said single opening formed extending through said resilient backing layer also passes through said piece of paper.

14. The mouse pad of claim 13 wherein said single opening is a partial U-shaped slit opening having a lip which may be opened by bending the lip away from said interior pocket to insert and remove said material containing visual information from said interior pocket.

15. The mouse pad of claim 12 wherein said single opening extends entirely through said resilient backing layer and said piece of paper and completely surrounds a full rectangular section, which full rectangular section may be completely removed from said resilient backing layer and said piece of paper to allow said material containing visual information to be easily inserted into or removed from said interior pocket.

16. The mouse pad of claim 9, further including a frame printed on said lower surface; said frame surrounding a clear window area, and said interior pocket is formed underneath said clear window area, between said lower surface and said upper surface.

17. The mouse pad of claim 16, further including an intermediate layer between said lower surface and said upper surface; said intermediate layer being sized and dimensioned to only cover said lower surface under said clear window area and a small portion of the surrounding frame; said intermediate layer including an upper surface and a lower surface; the upper surface of said intermediate layer secured between said surrounding frame on said lower surface around said clear window area and a portion of the upper surface of said bottom resilient layer in such a manner that said upper surface of said intermediate layer is not adhered to said lower area of said clear window area while the lower surface of said intermediate layer is entirely secured to said portion of said upper surface of said lower resilient layer to thereby form said interior pocket only under said clear window area.

18. The mouse pad of claim 17 wherein said single opening extends through said resilient backing layer and said intermediate layer and is a partial U-shaped slit opening.

19. The mouse pad of claim 18 wherein said partial U-shaped slit opening forms a lip which may be opened by bending away from said interior pocket to insert and remove said material containing visual information from said interior pocket.

20. The mouse pad of claim 17 wherein said single opening extends through said resilient backing layer and said intermediate layer, and surrounds a full rectangular section, which full rectangular section may be completely removed from said resilient backing layer and said intermediate layer.

* * * * *